UNITED STATES PATENT OFFICE.

JOHN W. KELLEY, OF CHICAGO, ILLINOIS.

COMPOSITION OF MATTER.

1,003,139. Specification of Letters Patent. Patented Sept. 12, 1911.

No Drawing. Application filed August 4, 1910. Serial No. 575,396.

*To all whom it may concern:*

Be it known that I, JOHN W. KELLEY, a citizen of the United States, and resident of Chicago, in the county of Cook and State of Illinois, have invented a certain new and useful composition of matter suitable for use as a binder and liquefier for core-sand, mineral, and other matter for paints, &c.; and I do hereby declare that the following description of my said invention forms a full, clear, and exact specification, which will enable others skilled in the art to which my invention appertains to make and use the same.

My composition of matter consists of the following ingredients combined in the proportion stated: resin oil, 20 to 80 gallons; wood oil, 80 to 20 gallons. These oils are to be thoroughly mixed and then combined with sand in sufficient quantity to moisten the same, which sand is then suitable for making sand-cores employed in foundry practice, which cores are then baked to become hard and the sand cohesive. Or this composition of matter is mixed with a dry substance in sufficient quantity to produce a liquid paint.

I prepare the resin oil as follows:

Take 100 lbs. of any resinous substance, such as that resulting from the treatment of gums in the manufacture of rubber, (such as is known as Guayule rubber) boil at a temperature of approximately 250 degrees Fahrenheit, and then add 12 gallons (more or less) of Harbin oil. This Harbin oil I compound, as follows: Take 100 gallons (more or less) of a hydrocarbon oil, such as kerosene oil, 20 lbs. (more or less) of calcium chlorid, and 1 gallon, (more or less) of muriatic acid, and thoroughly mix in a tank under constant agitation.

The wood-oil I prepare, as follows: Take 100 lbs. (more or less) of Chinese wood oil, also known as tong, or tung oil, add 7 lbs. (more or less) of burnt umber in a bag, and after boiling for some time to impart drying properties to the oil, remove the bag and then cool by adding 12 gallons (more or less) of the Harbin oil already mentioned and finally mix the oils in approximately the proportions heretofore stated, the quantity of each being determined by the use to which the compound is to be put.

The calcium chlorid and the hydrochloric acid seem to have no definite effect on the hydrocarban oil itself, but when added to the other constituents give an increased drying capacity to the mixture.

The effect of heating burnt umber, which contains manganese oxids and oxids of iron, with the Chinese wood oil at a temperature of 450 degrees Fahrenheit, is to form manganese and iron soaps which are more or less soluble in hot oil, and constitute true driers. This effect is very much greater when the oil contains free fat acids, as in rancid oil, a condition common to the Chinese wood oil. Thus drying properties are imparted to the oil by boiling with umber.

Having thus fully described this invention, I claim as new and desire to secure to me by Letters Patent of the United States—

1. The herein described composition of matter, consisting of a resinous substance, hydrocarbon·oil, chlorid of lime, hydrochloric acid, and Chinese wood oil.

2. The herein described composition of matter, comprising sand mixed with resin oil and wood oil, as hereinbefore set forth, in the proportions specified.

3. The herein described composition of matter, adapted for use as a core-oil, a liquefier, and binder for dry substances consisting of a mixture of resin oil, and wood oil, the resin oil being prepared by dissolving a resinous substance in Harbin oil, the latter oil being prepared by mixing a hydrocarbon oil with chlorid of lime and hydrochloric acid, the wood oil consisting of Chinese or tung oil treated with burnt umber and mixed with Harbin oil.

In testimony that I claim the foregoing as my invention, I have hereunto set my hand in the presence of two subscribing witnesses.

J. W. KELLEY.

Witnesses:
MICHAEL J. STARK,
M. F. SULLIVAN.

Copies of this patent may be obtained for five cents each, by addressing the "Commissioner of Patents, Washington, D. C."